(12) United States Patent
Kwan et al.

(10) Patent No.: US 7,830,801 B2
(45) Date of Patent: Nov. 9, 2010

(54) INTELLIGENT FABRIC CONGESTION DETECTION APPARATUS AND METHOD

(75) Inventors: Bruce H. Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1250 days.

(21) Appl. No.: 11/259,041

(22) Filed: Oct. 27, 2005

(65) Prior Publication Data

US 2006/0092840 A1     May 4, 2006

Related U.S. Application Data

(60) Provisional application No. 60/622,791, filed on Oct. 29, 2004, provisional application No. 60/672,514, filed on Apr. 19, 2005.

(51) Int. Cl.
*H04L 12/56*     (2006.01)

(52) U.S. Cl. ........................ 370/235; 370/230

(58) Field of Classification Search ................ 370/235, 370/395, 230, 229, 236, 412, 252, 319, 230.1, 370/395.42; 709/224; 710/52
See application file for complete search history.

(56) References Cited

U.S. PATENT DOCUMENTS

| | | | |
|---|---|---|---|
| 6,424,622 B1 * | 7/2002 | Fan et al. ................... 370/230 |
| 6,721,273 B1 * | 4/2004 | Lyon ........................... 370/235 |
| 7,069,356 B2 * | 6/2006 | Meyer et al. ................... 710/52 |
| 7,327,680 B1 * | 2/2008 | Kloth .......................... 370/235 |
| 2002/0003776 A1 * | 1/2002 | Gokhale et al. ............. 370/236 |
| 2002/0034163 A1 * | 3/2002 | Hamamoto et al. ....... 370/230.1 |
| 2004/0062200 A1 * | 4/2004 | Kesavan ..................... 370/235 |
| 2004/0081167 A1 * | 4/2004 | Hassan-Ali et al. .... 370/395.42 |
| 2005/0055440 A1 * | 3/2005 | Marilly et al. .............. 709/224 |
| 2005/0105532 A1 * | 5/2005 | Yun et al. .............. 370/395.21 |

* cited by examiner

*Primary Examiner*—Steven H Nguyen
*Assistant Examiner*—Syed Bokhari (57) ABSTRACT

An intelligent fabric congestion control apparatus and method are provided to receive data packets from source endpoints and output the data packets to destination endpoints. The apparatus and method include a counter, a timer, and a controller. The counter increments from a preset value when a data packet is received at an egress queue and decrements when the data packet is output from the egress queue. The timer starts timing in response to the incrementing of the counter from the preset value. The controller performs one of resetting the timer when the counter is decremented to the preset value prior to the timer reaching a first threshold, and detecting a persistent congestion when the timer reaches the first threshold.

24 Claims, 6 Drawing Sheets

| STATE | THRESHOLD LEVEL (ms) | NUMBER/PERCENTAGE OF DATA PACKETS TO MARK |
|---|---|---|
| 0 | 0 | 0% |
| 1 | 5 | 10% |
| 2 | 10 | 20% |
| 3 | 15 | 30% |
| : | : | : |
| 10 | 25 | 100% |

INTELLIGENT FABRIC CONGESTION DETECTION APPARATUS AND METHOD

REFERENCE TO RELATED APPLICATIONS

This application claims priority of U.S. Provisional Patent Application Ser. No. 60/622,791, filed Oct. 29, 2004 and U.S. Provisional Patent Application Ser. No. 60/672,514, filed Apr. 19, 2005. The subject matter of this earlier filed application is hereby incorporated by reference.

BACKGROUND OF THE INVENTION

1. Field of the Invention

The present invention relates to an apparatus and a method to detect persistent congestion in buffer constrained environments.

2. Description of the Related Art

An ideal network should be able to transmit useful traffic directly proportional to traffic offered to the network. Nonetheless, network operations diverge from an ideal network for a certain number of reasons which are all related to an inefficient allocation of resources in an overloaded environment. Congestion in packet networks may occur for example at routers where flows converge from different sources. As complicated networks may consist of numerous different end systems (sources and receivers), routers, and links, it is usually impossible to match their capacities perfectly. Accordingly, congestion will occur where more packets are received than can be handled.

Various ways of handling congestion are known. At the simplest level, buffering is provided to handle temporary overloads. For longer overloads, flow control mechanisms are provided, to enable downstream elements to cause a source of data packets to reduce the rate of sending packets. For instance, in the Internet, congestion is typically identified based on static queue thresholds or via a statistical average of a queue size (e.g., exponentially weighted moving average or EWMA). However, this type of identification is appropriate for systems with ample queuing, not when buffering resources are scarce.

An effective congestion mechanism is needed to offer fair packet delivery with full utilization of switch capacity. Accordingly, a congestion mechanism is needed for systems including small buffers and limited memory that will trigger congestion detection when persistent congestion occurs rather than for transient congestion events.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. The present invention described below provides a novel approach of detecting congestion in buffer constrained environments with minimal queuing. According to an embodiment of the present invention, timers are used to measure a period of time in combination with counters to determine when an egress queue has not reached empty. A timer-based approach is simple to tune based on a predetermined policy table that define thresholds over which the apparatus and method of the present invention would determine the congestion to be persistent; thus, avoiding incorrect detection of transient congestion events (i.e. false positives). Avoiding incorrect detection of transient congestion using the timer-based approach has a direct correlation to practical and predictable system parameters, such as the period of time required for congestion spread to occur throughout a network.

A way of detecting persistent congestion may be performed using a function that averages a queue size by applying a filter, which would take note of an average queue size, as follows:

$$Q_{avg} = \alpha Q_i + (1-\alpha) Q_{avg}, \qquad [1]$$

where $Q_i$ is an instantaneous queue, $Q_{avg}$ is the previous average computed, and $\alpha$ is a predetermined constant.

However, using the conventional averaging function does require a significant amount of computation time, counters, and buffering resources. Instead of requiring such significant amount of computation time, counters and buffering resources, according to an embodiment of the present invention, an intelligent fabric congestion control (IFCC) apparatus and method are described to provide persistent fabric congestion detection in buffer constrained environments with minimal queuing. The IFCC apparatus and method, in accordance with an embodiment of the present invention, utilizes intelligent fabric packet marking within a fabric system capable of supporting Forward Explicit Congestion Notification (FECN) fabric in concert with source endpoint rate limiting. FECN is a packet marking scheme used in a network of interconnection devices to signal to endpoints that congestion is experienced when traveling through portions of the network. Each endpoint is a component that is connected to either a single stage switch fabric configuration or a multi-stage switch fabric configuration. Examples of an endpoint include a 10 Gigabit Ethernet Network Interface Card (GE NIC) or any high speed port source module.

Figure 1:
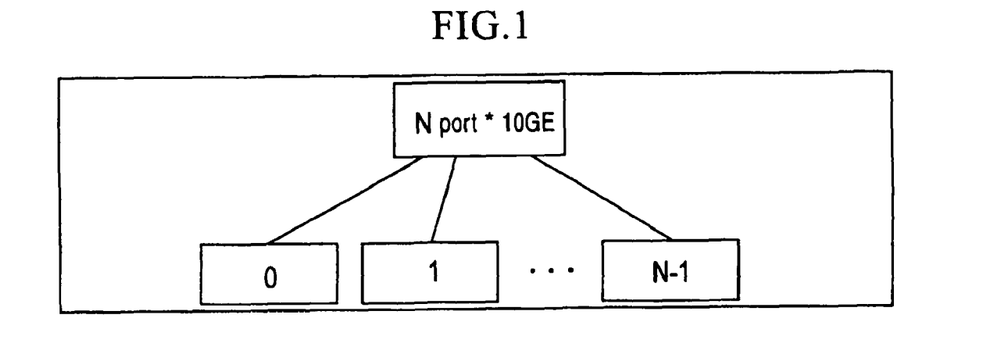
FIG. 1 illustrates a single stage switch fabric configuration device, in accordance with an embodiment of the present invention.
Figure 2:
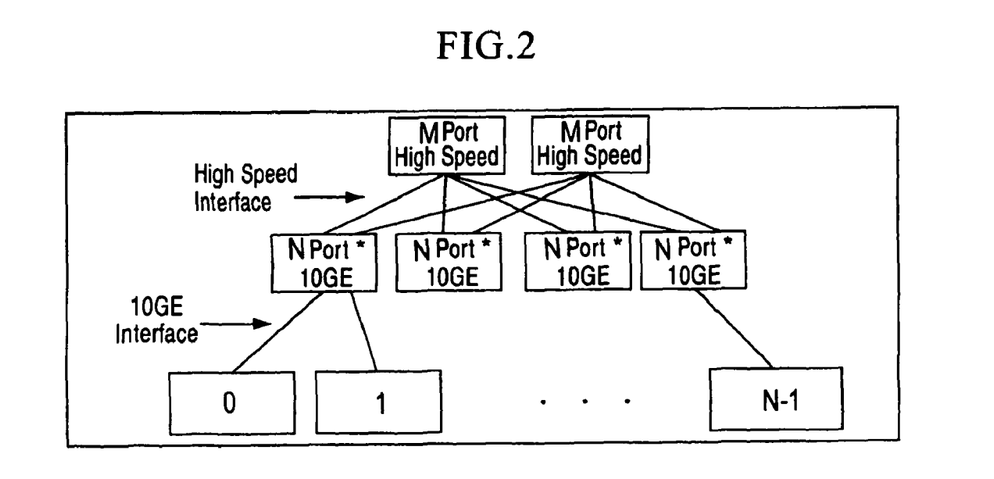
FIG. 2 illustrates a multi-stage switch fabric configuration device, in accordance with an embodiment of the present invention.

In accordance with an embodiment of the present invention, FIG. 1 illustrates a single-stage IFCC switch device is a high density port 10 GE switching device. In FIG. 1, a set of N endpoints may be connected to the singe stage IFCC device. In an alternative embodiment of the present invention, the single-stage IFCC device may be used as a part of a multi-stage IFCC fabric configuration device as shown in FIG. 2. In the configuration of FIG. 2, a multiple-stage IFCC switch device is configured to be an M port device including a set of 10 GE ports facing the endpoints and a set of generic high speed ports facing towards the second stage of the fabric.

The single-stage IFCC switch device and the multiple-stage IFCC switch device aim to achieve intelligent fabric congestion control, which is a mechanism used to combat persistent congestion. Persistent congestion may occur within the fabric due to oversubscription of a fabric egress port. The IFCC mechanism makes use of packet marking within the fabric (i.e., Forward Explicit Congestion Notification or FECN) and source endpoint rate control. This mechanism may be utilized to combat persistent congestion such as when multiple source endpoints are sending to the same destination endpoint for an extended period of time. Congestion control is the mechanism that is used to establish an optimal operating region during these persistent congestion scenarios.

Figure 3:
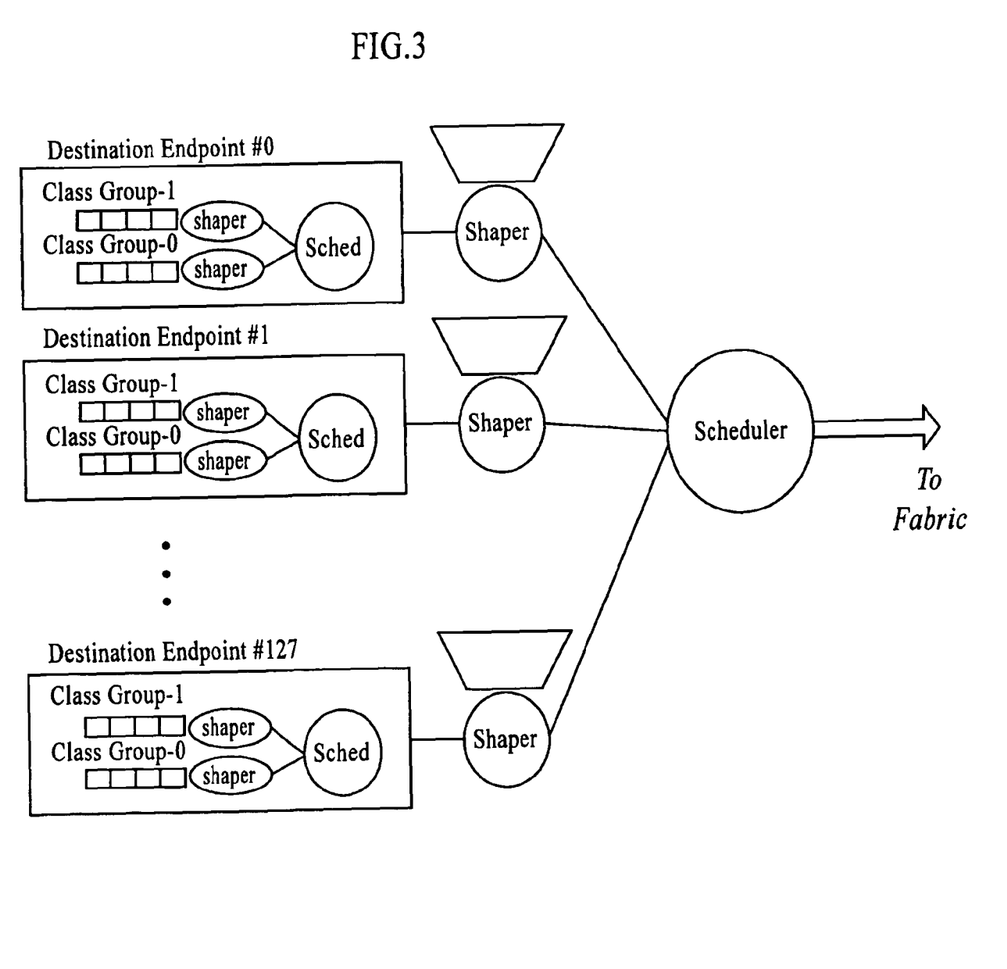
FIG. 3 illustrates an egress port link scheduler, in accordance with an embodiment of the present invention.

To support the intelligent fabric congestion control, as shown in FIG. 3, a scheduler may be able to provide the required rate control per destination endpoint and Class Group granularity. A Class Group is a grouping of COS queues. The goal of the Class Group concept is to enable coarse-grained flow control across more fine-grained queuing structures. Consequently, as shown in FIG. 3, traffic shaping is supported per destination endpoint and Class Group which is used to influence the scheduler to cease servicing specific destination endpoint COS queues associated with a specific Class Group. In an alternate embodiment, a scheduler may be able to provide the required rate control per destination endpoint and Class of Service granularity.

In accordance with an embodiment of the present invention, the IFCC apparatus and method determine how often an egress queue buffer per COS is emptying out received data packets. If the IFCC apparatus and method determine that the particular egress queue is not completely dequeuing the data packets for a predetermined period of time or time window, the IFCC apparatus and method determine an occurrence of a persistent congestion event. If during the time window the IFCC apparatus and method determine that the egress queue is emptying out or when the queue occupancies reach zero, then the IFCC apparatus and method determine that the persistent congestion event is not occurring. That is, the egress queue is operating fast enough over a specified time scale.

In addition, an observation of the system is that a stochastic renewal point for the IFCC system may be the point at which the egress queue becomes empty. A stable IFCC apparatus may be defined as an apparatus in which there are renewal points where the egress queue becomes empty. When the IFCC apparatus does not have renewal points, the IFCC apparatus may be considered unstable which may be used as a congestion indicator.

Figure 4:
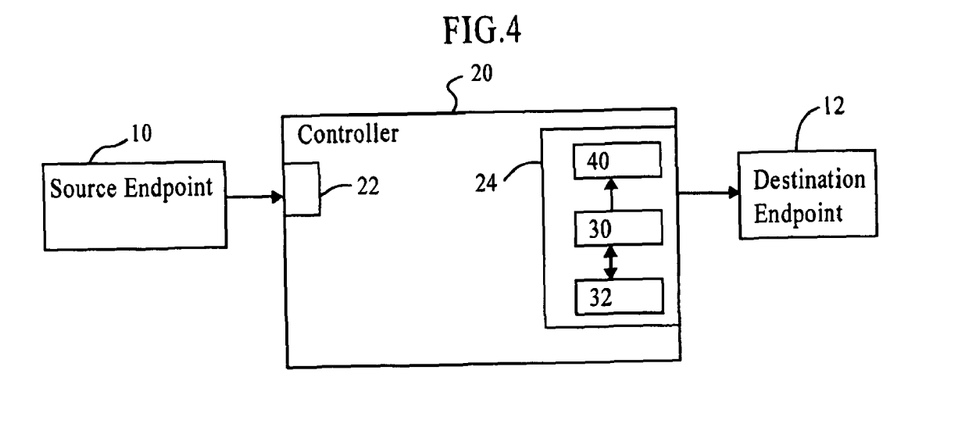
FIG. 4 illustrates a configuration of an intelligent fabric congestion control apparatus providing a counter and a timer per egress queue per COS, in accordance with an embodiment of the present invention.

FIG. 4 illustrates a configuration of the IFCC apparatus, in accordance with an embodiment of the present invention. The IFCC apparatus includes at least one source endpoint 10 transmitting data packets to at least one destination endpoint 12 through a single stage or multi-stage switch configuration fabric ("switch"). A controller 20 in the switch includes at least one ingress port 22 and at least one egress queue 24. The IFCC apparatus includes a timer 30 per egress queue 24 per egress port and COS pair. A counter 32 is also provided per egress COS queue 24 per egress port to keep track of the number of packets that are enqueued in the egress queue 24. Upon receipt of a data packet from at least one ingress port 22, the counter 32 is to be incremented to indicate an occurrence of the data packet being enqueued in the egress queue 24. At the same time, upon receipt of the data packet, the timer 30 associated with the particular egress queue 24 begins timing (incrementing) towards a preset threshold representing a level of congestion. After the data packet is dequeued from the egress queue 24, the counter 32 is decremented to indicate an occurrence that the data packet has been dequeued or output from the egress queue 24. The timer 30 does not stop until the counter 32 decrements and reaches zero. A user specified maximum size may also be defined. When the timer 30 reaches this maximum value, the timer no longer increments which will avoid having the timer wraparound back to 0.

Not reaching the preset threshold indicates that the data packets are dequeued without significant delay. That is, the timer 30 is reset indicating that the data packets flowing from the ingress queues 22 to the corresponding egress queue 24 are dequeued to the destination endpoint 12 without a delay or a significant delay. Thus, if during a short period of time, such as a transient period of time, the egress queue 24 is dequeuing the data packets with some delay and the counter 32 has not decremented to zero, the IFCC apparatus would not detect congestion at the egress queue 24 until the timer 30 reaches the preset threshold of congestion.

If at a point in time during the running of the counter 32, the timer 30 is close to reaching the preset threshold but the egress queue 24 is emptied and the counter 32 reaches zero, the timer 30 is then reset to 0 and stopped until a new packet arrival occurs and the counter 32 is incremented from 0 to 1. If the timer 30 reaches the preset threshold, then a persistent or consistent congestion experience bit tag is set indicating that congestion exists at the egress queue 24 associated with the timer 30.

Specifically, upon detection of a persistent congestion event, the controller 20 marks or attaches the congestion experience bit tag to a header of each data packet output from the particular egress queue 24 experiencing congestion. Alternatively, instead of marking frames, the mechanism may also trigger frame discards as well in response to congestion detection with the goal of indicating to the endpoints the presence of congestion through the use of frame discards. Endpoint protocols that may respond to frame discards include the Transport Control Protocol (TCP). Hence, the header of each data packet would include, for instance, a source address, a destination address, and the congestion experience bit tag. In addition, if the data packet to be marked is an Ethernet frame, the marking may occur by setting a CFI bit found in a VLAN tagged Ethernet frame. The controller 20 then outputs each marked data packet to the destination endpoint 12.

The destination endpoint 12 then receives and reads the source address of each data packet to determine whether one or more data packets have been marked with the congestion experience bit tag during transit through the controller 20 to thereby identify each source endpoint 32 contributing to the congestion. The destination endpoint 12 may keep a state on a per source endpoint 10 and per COS (or Class Group). The state includes two components:

1. Congestion State: A flag that specifies whether or not a particular source endpoint 10 and COS is currently identified as a congestion contributor to the destination endpoint 12.

2. Decision State: This is a statistical measure of the received packets on a per source endpoint 10 and COS basis that is used to determine whether or not a source endpoint 10 is a congestion contributor or not.

Subsequently, the destination endpoint 12 sends a message to notify each identified source endpoint 10 that is contributing to the congestion of the particular egress queue 24. The destination endpoint 12 may need to send a Congestion Notification (CN) message to each source endpoint that is contributing to the congestion event. The CN message minimally specifies the destination endpoint 12 reporting the message and whether or not a path leading to the destination endpoint 12 is congested. The CN message may also specify the Class Group that should be affected by the message.

Upon receipt of the CN message, the identified source endpoint 10 may either interrupt or pause further transmission of the data packets or reduce a rate of transmission of the data packets to be dequeued by the egress queue 24 experiencing congestion. The interruption or pause to the identified source endpoint 10 would pause one COS of the data packets without interrupting or pausing other COS of the data packets.

In addition, the timer 30 may be configured to detect multiple congestion thresholds crossings. The timer 30 may be set-up so that two or more congestion thresholds may be crossed. Each congestion threshold would be associated with a state, which may serve as a pointer to the controller 20 indicative of the threshold level of congestion reached by the timer 30. The number of states would vary depending on the number of threshold levels defined for the timer 30. The controller 20 would be configured to mark or drop a predetermined number or percentage of the data packets based on a particular threshold level of congestion.

Figure 5:
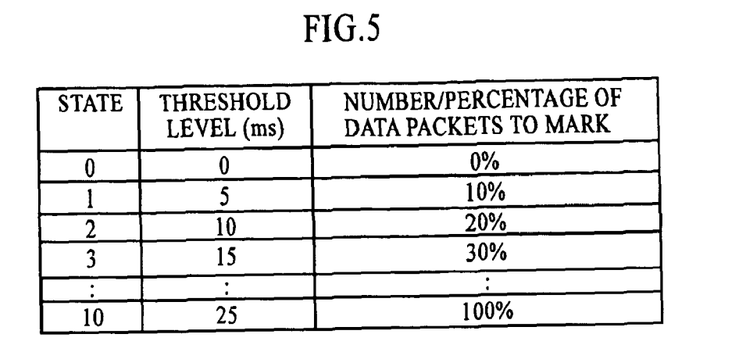
FIG. 5 illustrates a policy table, in accordance with an embodiment of the present invention.

To set-up multiple levels of threshold congestion, a policy table 40 may be implemented per egress queue 24 per COS, associating each threshold level of congestion with a corresponding state. FIG. 5 illustrates the policy table 40, in accordance with an embodiment of the present invention. The policy table 40 includes the state, the threshold level measured in milliseconds (for example), and a percentage of data packets to be marked (or dropped) when the timer 30 reaches each particular threshold level. Thus, as each congestion threshold is reached, the state of the timer 30 is increased and the controller 20 would mark (or drop), according to the state of the controller 20 and/or the congestion threshold, a certain percentage or number of data packets with the congestion experience bit tag. A person of ordinary skill in the art will appreciate that the values of the congestion threshold and the number or percentage of data packets to be marked in the policy table 40 of FIG. 5 may vary depending on a particular application.

For instance, when the timer 30 is reset, i.e., no congestion occurs, the state is zero and 0% of packets are marked. When the timer 30 does not reach zero for a duration greater than or equal to the first threshold but less than the second threshold, the state of the timer 30 is one, 10% of the data packets are marked with the congestion detection experience bit tag, and the destination endpoint 12 reads the source addresses of the marked data packets and notifies the associated source endpoint 10 of its contribution to the congestion event. Upon receipt of the notification or the CN message each source endpoint 10 identified as contributing to the congestion may either reduce the transmission rate, pause, or interrupt the transmission of the data packets. In accordance with an embodiment of the present invention, whether to reduce the transmission rate, or interrupt or pause the transmission of the data packets may be determined based on the state of the controller 20 or the number or the percentage of data packets being marked with the congestion detection experience bit tag and may depend on a particular application. Alternatively, the packet may be dropped instead of marked.

When the timer 30 keeps increasing to a value greater than or equal to the second threshold of 5 ms but less than the third threshold, the state of the controller 20 is two, 20% of the data packets are marked with the congestion detection experience bit tag and the controller 20 notifies the source endpoints 10 of the persistent congestion associated with the marked data packets. When the maximum threshold (e.g., 25 ms) is reached at the highest state (e.g., 10), then all or 100% of the data packets are marked and all the source endpoints 10 are notified that they are contributing to the congestion.

Figure 6:
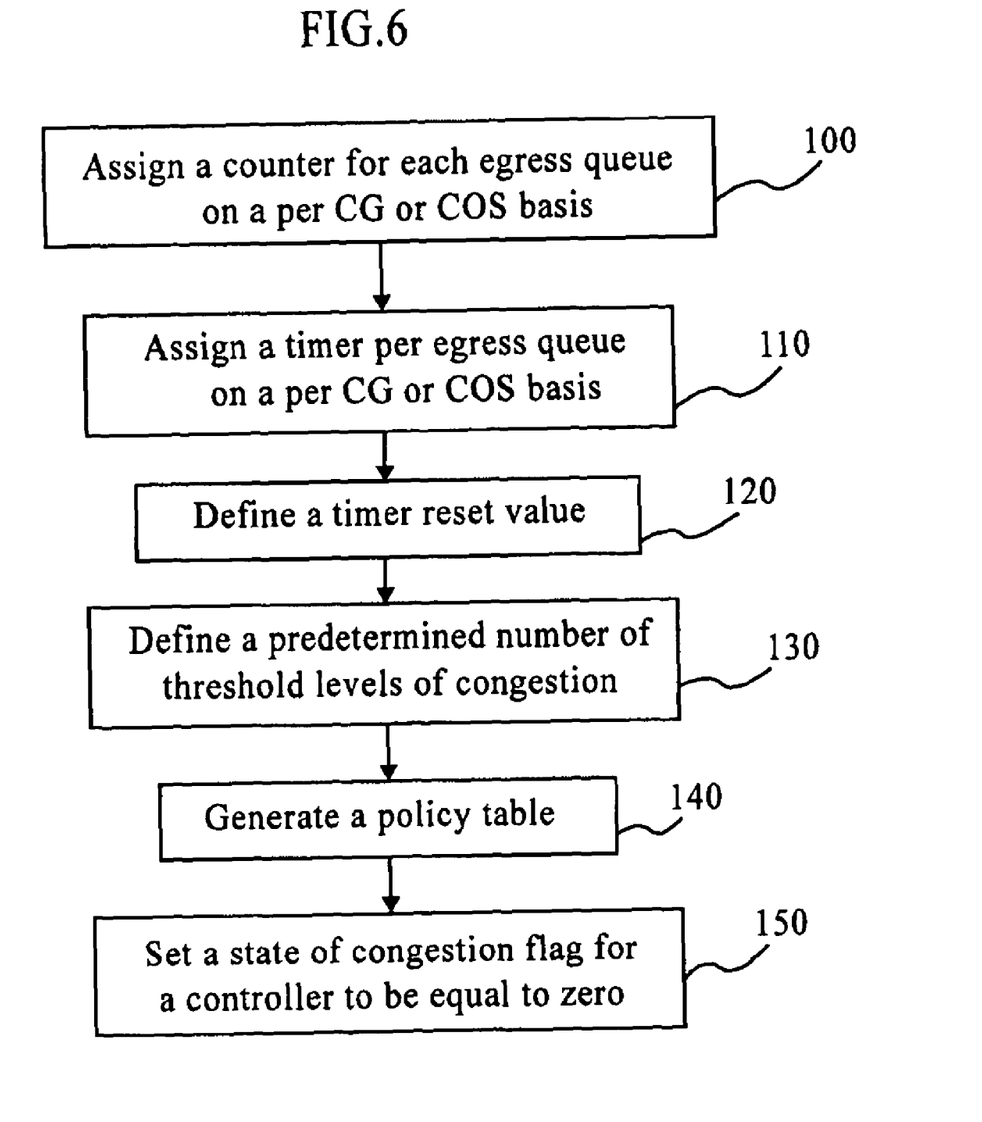
FIG. 6 illustrates a set-up method performed, in accordance with an embodiment of the present invention.

FIG. 6 illustrates a set-up method performed, in accordance with an embodiment of the present invention. At operation 100, the method assigns the counter 32 for each egress queue 24 on a per COS basis. At operation 110, the method assigns a timer 30 per egress queue 24 on a per COS basis. At operation 120, the method defines a timer reset value, such as zero. At operation 130, the method defines a predetermined number of congestion thresholds that the timer 30 may cross. At operation 140, to define the congestion thresholds, the method generates the policy table 40 defining each state of the controller 20 with the associated congestion threshold and the corresponding percentage or set number of data packets to be marked when the timer 30 reaches each congestion threshold. At operation 150, the method sets the state of the controller 20 to be equal to zero.

Figure 7:
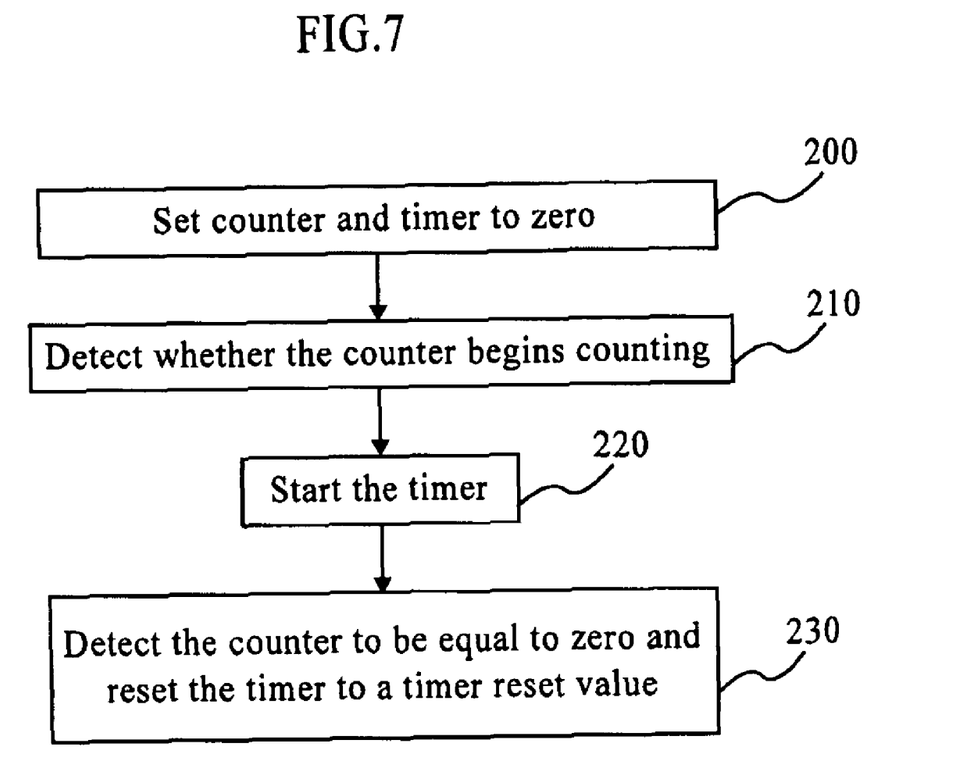
FIG. 7 illustrates a method performed during normal operation, in accordance with an embodiment of the present invention.

FIG. 7 illustrates a method performed by the controller 20 during normal operation of enqueuing and dequeuing of the data packets, in accordance with an embodiment of the present invention. At operation 200, the counter 32 is set to zero and the timer 30 is set to a reset value based on the policy table 40. The timer 30 remains at zero so long as the counter 32 does not start counting above 0. At operation 210, the counter 32 starts counting. At operation 220, once the counter 32 starts counting, the timer 30 begins timing. At operation 230, the method detects that the counter 32 reaches zero indicative that persistent congestion did not occur. As a result, the timer 30 is reset and then the method repeats operations 210-230.

Figure 8:
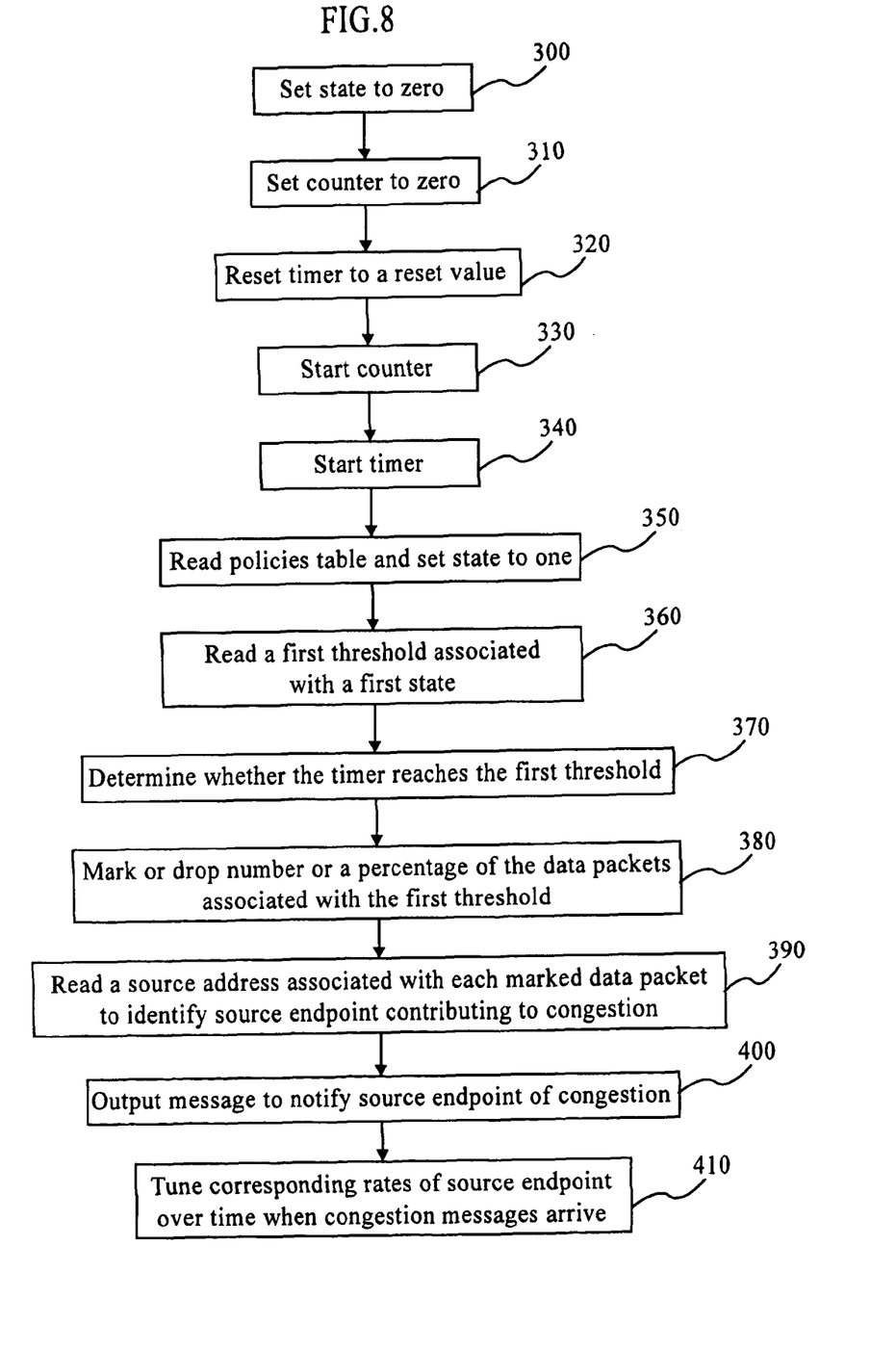
FIG. 8 illustrates an intelligent fabric congestion control method, in accordance with an embodiment of the present invention.

FIG. 8 illustrates the IFCC method performed to detect congestion, in accordance with an embodiment of the present invention. At operation 300, the method reads the policy table 40 and sets the pointer of the controller 20 to a zero state in the policy table 40. At operation 310, the method sets the counter 32 to zero. At operation 320, the method resets the timer 30 to the reset value of zero based on the policy table 40. At operation 330, the method detects that the counter 32 associated with the egress queue 24 starts counting indicative that the egress queue 24 is receiving the data packets from the ingress queue 22. At operation 340, the timer 30 begins timing. The timer 30 does not stop until the counter 32 reaches zero again. However, the timer may rise to a maximum level, after which the timer will no longer rise anymore, thus avoiding wrap-around. At operation 350, the method reads the policy table 40 and the state for the controller 20 is set to one (i.e., a first state). At operation 360, the method reads the first threshold associated with the first state from the policy table 40. At operation 370, the method determines whether the timer 30 has reached the first threshold.

At operation 380, once the method determines that the first threshold is reached, the method marks or drops the number or the percentage of the data packets associated with the first threshold level. Reaching the first threshold is indicative that the counter 32 has not reached zero and indicative that a degree of congestion exists. At operation 390, the method receives and reads the source address associated with each data packet to determine whether one or more data packets have been marked with the congestion experience bit tag during transit through the controller 20 to thereby identify each source endpoint 32 contributing to the congestion. At operation 400, the method outputs the CN message to notify each identified source endpoint 10 that it is contributing to the congestion of the particular egress queue 24. In an alternative embodiment, the detection of congestion could also cause the switch itself to generate the CN message itself as well.

Accordingly, the source endpoint 10 identified would either interrupt or pause further transmission of the data packets or reduce the transmission of the data packets to be output by the egress queue 24 experiencing congestion. The interruption or pause or reduction in rate of transmission of the data packets from the identified source endpoint 10 would affect the transmission of the data packets to be output by the particular egress queue 24 per COS without affecting the transmission of other data packets to be dequeued by other egress queues corresponding to other COSs.

In the alternative, the source endpoint 10 may cease transmission into the fabric or controller 20 for a specific Class Group, which is accomplished by supporting Class Group level queueing at each source endpoint 10 contributing to the congestion, or the source endpoint 10 would reduce the transmission rate of the data packets into the controller 20 for a specific destination endpoint 12 and the specific Class Group, which is accomplished by having destination endpoint 12 and Class Group queuing at each source endpoint 10 contributing to the congestion.

At operation 410, the method tunes, through the source endpoint 10, transmission rates over time when CN messages arrive. An example of a congestion control algorithm that may be used is a conventional Additive Increase Multiplicative Decrease (AIMD) approach.

After operation 410, the method determines whether the counter 32 has reached zero. If the counter 32 has reached zero, then the timer 30 is reset to zero. Otherwise, if the method determines that the counter 32 has not reached zero, the method determines whether the timer 30 is timing to reach the second threshold of congestion, according to the policy table 40, by repeating operations 350 to 410.

Accordingly, the method continuously monitors each egress COS queue using the corresponding counters and timers to determine whether persistent congestion occurs and a congestion threshold crossing occurring at a particular egress queue. The method also dynamically notifies source endpoints of data packets of the congestion occurring at the egress queue by marking the data packets with the congestion detection experience tags or dropping the data packets. Depending on a number of data packets being marked, the method is able to notify the level of congestion and allow the source endpoints to reduce a rate of transmission of the data packets or stop transmission of the data packets until the congestion is resolved. Congestion is resolved when the counter reaches zero by detecting that the corresponding egress queue has dequeued all of the data packets from its queue and the timer is reset to a reset value.

Further, depending on a congestion state, a destination endpoint may need to send CN messages to the source endpoints that are contributing to the congestion event. The CN messages minimally specify the destination endpoint reporting the CN message and whether a path leading to the destination endpoint is congested. The CN message may also specify the Class Group that would be affected by the CN message.

The queuing system and process leverage basic queuing theory concepts to intelligently identify persistent congestion in buffering constrained environments. The queuing system and process do not suffer from incorrect detection of transient congestion (i.e. false positives). In addition, the timer-based approach is simple to tune based on a time over which a user considers congestion to be persistent, which has a direct correlation to practical and predictable system parameters such as the time required for congestion spread to occur throughout the network.

An alternative embodiment of the present invention may provide a windowed average of link utilization. Instead of determining whether the egress port buffer is empty or not empty as the trigger of the timer, the IFCC apparatus and method thereof would measure, during a predetermined time window, an average of busy versus idle time of the egress queue and compare such average with a threshold to determine whether persistent congestion exists at the egress queue. The system would average out momentary events where the egress queue does hit zero. This averaging would make the detection less sharply reactive and may be tuned to handle a wider set of traffic scenarios.

According to an embodiment of the present invention, an intelligent fabric congestion control is provided through a single stage switch configuration based fabric or a multi-stage switch configuration based fabric to provide in switching fabrics lossless packet delivery and prevent congestion spreading to maximize fabric utilization.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An intelligent fabric congestion control apparatus for receiving data packets from source endpoints and outputting the data packets to destination endpoints, the intelligent fabric congestion control apparatus comprising: a counter configured to increment starting at a preset value when a data packet is received at an egress queue and decrement when the data packet is output from the egress queue; a timer configured to start timing in response to the incrementing of the counter from the preset value; and a controller configured to perform: resetting the timer when the counter is decremented to the preset value prior to the timer reaching a first threshold, and detecting a persistent congestion when the timer reaches the first threshold by measuring, during a predetermined time window, an average of busy versus idle time of the egress queue and comparing the average with a second threshold to determine whether persistent congestion exists at the egress queue.

2. The intelligent fabric congestion control apparatus recited in claim 1, further comprising:
a policy table comprising multiple threshold levels of congestion, each associated with a state, wherein each respective state serves as a pointer to the controller indicative of a congestion threshold reached by the timer, and a number or a percentage of data packets to be marked or dropped.

3. The intelligent fabric congestion control apparatus recited in claim 1, wherein the counter comprises multiple counters and the timer comprises multiple timers, each of the multiple counters and multiple timers being operationally coupled with a respective egress COS queue.

4. The intelligent fabric congestion control apparatus recited in claim 1, wherein the controller is further configured to, upon detecting that the timer has reached the first threshold, mark or drop a number or a percentage of the data packets in accordance with the first threshold.

5. The intelligent fabric congestion control apparatus recited in claim 4, wherein the controller marking the data packets comprises the controller attaching a congestion experience bit tag to a header of each marked data packet.

6. The intelligent fabric congestion control apparatus recited in claim 5, wherein the destination endpoints associated with the marked data packets read a respective source address associated with each marked data packet to identify at least one source endpoint contributing to the persistent congestion.

7. The intelligent fabric congestion control apparatus recited in claim 6, wherein the destination endpoints generate and send a congestion notification message to notify the at least one source endpoint of the at least one source endpoint's contribution to the persistent congestion of the egress queue.

8. The intelligent fabric congestion control apparatus recited in claim 7, wherein, upon receipt of the congestion notification message, the at least one source endpoint interrupts or reduces a respective rate of transmission of data packets of a Class of Service (COS) associated with the persistent congestion without affecting the transmission of data packets corresponding to other COSs.

9. The intelligent fabric congestion control apparatus recited in claim 1, further comprising:
an egress port link scheduler providing transmission rate control on a class group or COS granularity and transmission rate control per destination endpoint.

10. The intelligent fabric congestion control apparatus as recited in claim 1, wherein the preset value is equal to zero.

11. An intelligent fabric congestion control apparatus, comprising:
an ingress queue configured to receive data packets from a source endpoint;
an egress queue configured to receive the data packets from the ingress queue and communicate the data packets to a destination endpoint; and
a controller configured to measure, during a predetermined time window, an average of busy versus idle time of the egress queue and compare the average with a threshold to determine whether persistent congestion exists at the egress queue.

12. The intelligent fabric congestion control apparatus as recited in claim 11, wherein the controller is further configured to:
mark a number of the data packets in accordance with a mark number or percentage associated with the threshold; and
dequeue the marked packets from the egress queue.

13. An intelligent fabric congestion control method for receiving data packets from source endpoints and outputting the data packets to destination endpoints, the method comprising: incrementing, in a network device, a counter from a preset value when a data packet is received; decrementing the counter when the data packet is output; starting, in the network device, a timer in response to the incrementing of the counter from the preset value; resetting the timer when the counter is decremented to the preset value prior to the timer reaching a first threshold; and detecting a persistent congestion when the timer reaches the first threshold by measuring, during a predetermined time window, an average of busy versus idle time of the egress queue and comparing the average with a second threshold to determine whether persistent congestion exists at the egress queue.

14. The intelligent fabric congestion control method recited in claim 13, further comprising:
reading a policy table to set a pointer of the controller to a zero state.

15. The intelligent fabric congestion control method recited in claim 13, wherein the counter comprises multiple counters and the timer comprises multiple timers, the method further comprising:
providing each of the multiple counters and timers to a respective egress COS queue.

16. The intelligent fabric congestion control method recited in claim 15, wherein, after the starting of the timer, the method further comprises:
reading a policy table to set a pointer to a first state;
reading a value of the first threshold associated with the first state from the policy table; and
reading a number or a percentage of the data packets to be marked, the number or percentage being associated with the first threshold.

17. The intelligent fabric congestion control method recited in claim 16, wherein, upon detecting that the timer has reached the first threshold, further comprising:
marking or dropping the number or percentage of the data packets.

18. The intelligent fabric congestion control method recited in claim 17, further comprising:
reading a source address associated with each marked data packet to identify at least one source endpoint contributing to the persistent congestion.

19. The intelligent fabric congestion control method recited in claim 18, further comprising:
generating a congestion notification message; and
sending the congestion notification message to the at least one source endpoint to notify the at least one source endpoint of the at least one source endpoint's contribution to the persistent congestion of the egress queue.

20. The intelligent fabric congestion control method recited in claim 19, further comprising:
mapping the congestion notification message to the highest priority Class of Service queue to ensure prompt delivery of the congestion notification message to the at least one source endpoint.

21. The intelligent fabric congestion control method as recited in claim 19, wherein, upon receipt of the congestion notification message, the method further comprises:
interrupting or reducing a rate of transmission of the data packets from the at least one source endpoint for a Class of Service (COS) associated with the persistent congestion without affecting a rate of transmission of the data packets corresponding to other COSs.

22. The intelligent fabric congestion control method as recited in claim 17, wherein the marking of the data packets comprises:
attaching a congestion experience bit tag to a header of each marked data packet.

23. An intelligent fabric congestion control method, comprising:
transmitting, in a network device, data packets from an ingress queue to an egress queue; and
measuring, in the network device during a predetermined time window, an average of busy versus idle time of the egress queue and comparing the average with a threshold to determine whether persistent congestion exists at the egress queue.

24. The intelligent fabric congestion control method as recited in claim 23, further comprising:
marking or dropping a number of the data packets in accordance with a mark or drop rate associated with the threshold.

* * * * *

UNITED STATES PATENT AND TRADEMARK OFFICE
CERTIFICATE OF CORRECTION

| | |
|---|---|
| PATENT NO. | : 7,830,801 B2 |
| APPLICATION NO. | : 11/259041 |
| DATED | : November 9, 2010 |
| INVENTOR(S) | : Bruce H. Kwan et al. |

It is certified that error appears in the above-identified patent and that said Letters Patent is hereby corrected as shown below:

In column 8, line 33-50, in claim 1, delete "1. An intelligent fabric congestion control apparatus for receiving data packets from source endpoints and outputting the data packets to destination endpoints, the intelligent fabric congestion control apparatus comprising: a counter configured to increment starting at a preset value when a data packet is received at an egress queue and decrement when the data packet is output from the egress queue; a timer configured to start timing in response to the incrementing of the counter from the preset value; and a controller configured to perform: resetting the timer when the counter is decremented to the preset value prior to the timer reaching a first threshold, and detecting a persistent congestion when the timer reaches the first threshold by measuring, during a predetermined time window, an average of busy versus idle time of the egress queue and comparing the average with a second threshold to determine whether persistent congestion exists at the egress queue." and insert -- 1. An intelligent fabric congestion control apparatus for receiving data packets from source endpoints and outputting the data packets to destination endpoints, the intelligent fabric congestion control apparatus comprising:
   a counter configured to increment starting at a preset value when a data packet is received at an egress queue and decrement when the data packet is output from the egress queue;
   a timer configured to start timing in response to the incrementing of the counter from the preset value; and
   a controller configured to perform:
   resetting the timer when the counter is decremented to the preset value prior to the timer reaching a first threshold, and detecting a persistent congestion when the timer reaches the first threshold by measuring, during a predetermined time window, an average of busy versus idle time of the egress queue and comparing the average with a second threshold to determine whether persistent congestion exists at the egress queue. --, therefor.

In column 9, line 49-64, in claim 13, delete "13. An intelligent fabric congestion control method for receiving data packets from source endpoints and outputting the data packets to destination endpoints, the method comprising: incrementing, in a network device, a counter from a preset value when a data Signed and Sealed this
Fourteenth Day of June, 2011

David J. Kappos
*Director of the United States Patent and Trademark Office* packet is received; decrementing the counter when the data packet is output;
starting, in the network device, a timer in response to the incrementing of the counter from the preset value; resetting the timer when the counter is decremented to the preset value prior to the timer reaching a first threshold; and detecting a persistent congestion when the timer reaches the first threshold by measuring, during a predetermined time window, an average of busy versus idle time of the egress queue and comparing the average with a second threshold to determine whether persistent congestion exists at the egress queue." and insert -- 13. An intelligent fabric congestion control method for receiving data packets from source endpoints and outputting the data packets to destination endpoints, the method comprising:
incrementing, in a network device, a counter from a preset value when a data packet is received;
decrementing the counter when the data packet is output;
starting, in the network device, a timer in response to the incrementing of the counter from the preset value;
resetting the timer when the counter is decremented to the preset value prior to the timer reaching a first threshold; and
detecting a persistent congestion when the timer reaches the first threshold by measuring, during a predetermined time window, an average of busy versus idle time of the egress queue and comparing the average with a second threshold to determine whether persistent congestion exists at the egress queue. --, therefor.